(12) United States Patent
Noda et al.

(10) Patent No.: US 9,920,439 B2
(45) Date of Patent: Mar. 20, 2018

(54) WATER SPLITTING METHOD

(71) Applicant: Panasonic Intellectual Property Management Co., Ltd., Osaka (JP)

(72) Inventors: Keiichi Noda, Hyogo (JP); Satoshi Yotsuhashi, Osaka (JP); Masahiro Deguchi, Osaka (JP); Hiroshi Hashiba, Osaka (JP); Takeyuki Sekimoto, Osaka (JP); Yuka Yamada, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 133 days.

(21) Appl. No.: 14/997,427

(22) Filed: Jan. 15, 2016

(65) Prior Publication Data
US 2016/0222525 A1 Aug. 4, 2016

(30) Foreign Application Priority Data
Feb. 3, 2015 (JP) ................................ 2015-019327

(51) Int. Cl.
C25B 1/00 (2006.01)
C25B 1/10 (2006.01)
C25B 11/04 (2006.01)

(52) U.S. Cl.
CPC ................ C25B 1/10 (2013.01); C25B 1/003 (2013.01); C25B 11/041 (2013.01);
(Continued)

(58) Field of Classification Search
CPC ..... C25B 1/10; C25B 11/041; C25B 11/0478; C25B 1/003; Y02E 60/364; Y02E 60/366
(Continued)

(56) References Cited

U.S. PATENT DOCUMENTS 4,392,927 A * 7/1983 Fabian ................ C25B 11/0478
204/252
8,709,228 B2 4/2014 Deguchi et al.
(Continued)

FOREIGN PATENT DOCUMENTS

JP 2003-024764 1/2003
JP 2011-173102 9/2011
(Continued)

OTHER PUBLICATIONS

Liao et al, "Co3O4 Nanoparticles as Robust Water Oxidation Catalysts Towards Remarkably Enhanced Photostability of a Ta3N5 Photoanode," Adv. Funct. Mater. 2012, 22, 3066-3074 (Year: 2012).*

(Continued)

*Primary Examiner* — Ibrahime A Abraham
*Assistant Examiner* — Colleen M Raphael
(74) *Attorney, Agent, or Firm* — McDermott Will & Emery LLP (57) ABSTRACT

The present invention provides a method for splitting water. In the present method, first, prepared is a water splitting device comprising: cathode and anode containers in which first and second electrolyte solutions are stored respectively; a proton exchange membrane disposed therebetween; a cathode electrode in contact with the first electrolyte solution and comprises a metal or metal compound; and an anode electrode in contact with the second electrolyte solution and comprises a nitride semiconductor layer. Then, the anode electrode is irradiated with light to split water contained in the first electrolyte solution. The anode electrode comprises a cobalt oxide layer formed of $Co_3O_4$ as a main component on a surface of the nitride semiconductor layer; the surface of the nitride semiconductor layer being in contact with the second electrolyte solution. The cathode (Continued)

electrode is electrically connected to the anode electrode without an external power supply.

7 Claims, 8 Drawing Sheets

(52) U.S. Cl.
CPC ......... *C25B 11/0478* (2013.01); *Y02E 60/364* (2013.01); *Y02E 60/366* (2013.01)

(58) Field of Classification Search
USPC ........................................................ 205/340
See application file for complete search history.

(56) References Cited

U.S. PATENT DOCUMENTS

| | | | |
|---|---|---|---|
| 8,758,578 B2 | 6/2014 | Nomura et al. | |
| 2013/0001094 A1* | 1/2013 | Cable | H01M 14/00 205/340 |
| 2014/0209456 A1* | 7/2014 | Kim | C25B 1/003 204/242 |
| 2014/0238847 A1* | 8/2014 | Lee | C25B 1/003 204/290.03 |
| 2015/0111119 A1* | 4/2015 | Tamura | C25B 1/003 205/340 |
| 2016/0032462 A1* | 2/2016 | Yamaguchi | C25B 1/003 204/252 |

FOREIGN PATENT DOCUMENTS

| | | |
|---|---|---|
| JP | 2012-187520 | 10/2012 |
| WO | 2011/016244 | 2/2011 |
| WO | 2013/031063 | 3/2013 |
| WO | WO-2015013776 A1 * | 2/2015 ........... C25B 1/0003 |

OTHER PUBLICATIONS

Hou et al, "Cobalt-bilayer catalyst decorated Ta3N5 nanorod arrays as integrated electrodes for photoelectrochemical water oxidation," Energy Environ. Sci., 2013, 6, 3322-3330 (Year: 2013).*

Zhang et al, "Photoelectrochemical water oxidation of LaTaON2 under visible-light irradiation," Int'l J. of Hydrogen Energy 39 (2014) 7697-7704 (Year: 2014).*

Feng et al, "Highly Photo-Responsive LaTiO2N Photoanodes by Improvement of Charge Carrier Transport among Film Particles," Adv. Funct. Mater. 2014, 24, 3535-3542 (Year: 2014).*

Tomoe Hayashi et al., "High Stability and Efficiency of GaN Photocatalyst for Hydrogen Generation from Water" Japanese Journal of Applied Physics 51(2012) 112601.

Satoshi Yotsuhashi et al., "Enhanced CO2 reduction capability in an AlGaN/GaN photoelectrode" Applied Physics Letters 100, 243904, 2012.

Keiichi Noda et al., "Effect of supporting Co3O4 co-catalyst on GaN photo-electrode" The Chemical Society of Japan, Mar. 11, 2015.

* cited by examiner

WATER SPLITTING METHOD

BACKGROUND

1. Technical Field

The present disclosure relates to a water splitting method. The present disclosure also relates to a water splitting device and an anode electrode used therein for generating oxygen.

2. Description of the Related Art

In the conventional water splitting technique, water is split into hydrogen and oxygen by irradiating a semiconductor material which functions as a photocatalyst with light.

Japanese Patent laid-open Publication No. 2003-024764A discloses a method for splitting water into hydrogen and oxygen using a nitride semiconductor as an anode electrode (i.e., a photochemical electrode).

SUMMARY

The present invention provides a method for splitting water, the method comprising:
(a) preparing a water splitting device comprising:
a cathode container in which a first electrolyte solution is stored;
an anode container in which a second electrolyte solution is stored;
a proton exchange membrane disposed between the cathode container and the anode container;
a cathode electrode which is in contact with the first electrolyte solution and comprises a metal or metal compound; and
an anode electrode which is in contact with the second electrolyte solution and comprises a nitride semiconductor layer;
(b) irradiating the anode electrode with light to split water contained in the first electrolyte solution;
wherein
the anode electrode comprises a cobalt oxide layer formed of $Co_3O_4$ as a main component on a surface of the nitride semiconductor layer; the surface of the nitride semiconductor layer being in contact with the second electrolyte solution; and
the cathode electrode is electrically connected to the anode electrode without an external power supply.

The present disclosure provides a method for splitting water stably for a long time.

THE DETAIL DESCRIPTION OF THE EMBODIMENT

In the conventional water splitting technique, an anode electrode formed of a nitride semiconductor may be etched by the electrolyte solution and the carriers which have generated by light irradiation. This deteriorates the anode electrode. As a result, it is difficult to split water stably for a long time.

An object of the present disclosure is to provide a method for splitting water stably for a long time.

Hereinafter, the method according to the present disclosure will be described with reference to the drawings.

(Anode Electrode for Generating Oxygen)

Figure 1A:
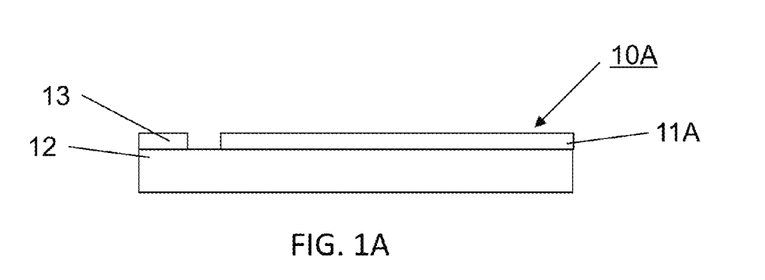
FIG. 1A is a cross-sectional view schematically showing an embodiment of an anode electrode according to the present disclosure.

FIG. 1A is a schematic view showing an embodiment of a structure of an anode electrode (i.e., photochemical electrode) 10A used for the water split method according to the present disclosure. The anode electrode 10A shown in FIG. 1A comprises a cobalt oxide layer 11A formed of $Co_3O_4$ as a main component, a nitride semiconductor substrate 12 formed of a nitride semiconductor material, and a terminal electrode 13.

The cobalt oxide layer 11A is composed of a thin film formed of $Co_3O_4$ as a main component. The thin film formed of $Co_3O_4$ as a main component may be a thin film having $Co_3O_4$ by 50% or more at a volume ratio. As long as the cobalt oxide layer 11A has $Co_3O_4$ as a main component, the cobalt oxide layer 11A may contain CoO or elemental cobalt. As one example, the cobalt oxide layer 11A may have a thickness of not more than 10 nanometers. The cobalt oxide layer 11A having such a thickness does not prevent the nitride semiconductor substrate 12 from being irradiated with light. The cobalt oxide layer 11A need not be flat. In other words, the cobalt oxide layer 11 may be uneven. The cobalt oxide layer 11A need not be disposed on the whole surface of the nitride semiconductor substrate 12. In other words, the cobalt oxide layer 11A may be disposed partially on the surface of the nitride semiconductor layer 12.

Figure 1B:
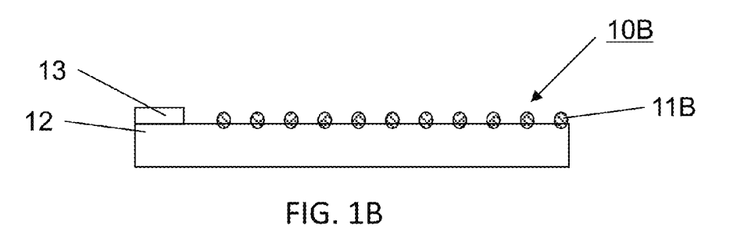
FIG. 1B is a cross-sectional view schematically showing another embodiment of the anode electrode according to the present disclosure.

FIG. 1B is a schematic view showing an embodiment of another structure of the anode electrode according to the present disclosure. A cobalt oxide layer 11B of a anode electrode 10B shown in FIG. 1B is composed of particles each formed of $Co_3O_4$ as a main component. In this case, the particles each formed of $Co_3O_4$ as a main component are disposed in such a manner that the cobalt oxide layer 11B does not prevent the nitride semiconductor substrate 12 to be irradiated with light. As one example, the cobalt oxide layer 11B has a thickness of not more than 10 nanometers. Fine particles each having a small size than the particle may be disposed between the particles so as to form an interval through which the light passes toward the nitride semiconductor substrate 12. The fine particle may have a diameter of not more than 25 nanometers. In this case, the shape of the particles need not be constant. The particles having various shapes and sizes may be disposed randomly on the surface of the nitride semiconductor substrate 12.

The nitride semiconductor substrate 12 is formed of gallium nitride (composition formula: GaN), aluminum gallium nitride (composition formula: $Al_{1-x}Ga_xN$, where $0<x\leq1$), indium gallium nitride (composition formula: $In_{1-y}Ga_yN$, where $0<y\leq1$) or aluminum indium gallium nitride (composition formula: $In_{1-y}Al_{1-x}Ga_{x+y}N_2$, where $0<x\leq1$, $0<y\leq1$, and $0<x+y<2$).

The nitride semiconductor substrate 12 has a fundamental function of absorbing light. When the nitride semiconductor substrate 12 absorbs light, carriers (i.e., electrons and holes) are generated through the photoexcitation. The carriers contribute an oxidation—reduction reaction. Specifically, the holes generated through the photoexcitation in the inside of the nitride semiconductor substrate 12 migrate to the surface of the anode electrode 10A. The holes which have reached the surface of the anode electrode 10A oxidize water in contact with the anode electrode 10A to generate oxygen. In other words, the anode electrode 10A itself serves as an oxygen generation electrode. On the other hand, the electrons generated through the photoexcitation in the inside of the nitride semiconductor substrate 12 are collected to the terminal electrode 13 provided on the anode electrode 10A. The electrons migrate to the cathode electrode through the conducting wire. On the cathode electrode, water is reduced by the electrons which have migrated to the cathode electrode. The electric potential applied to the cathode electrode is a photovoltaic power which has generated in the nitride semiconductor substrate 12.

As long as the nitride semiconductor substrate 12 absorbs the incident light sufficiently, the thickness of the nitride semiconductor substrate 12 is not limited. The nitride semiconductor substrate 12 may have a thickness of not less than 200 micrometers and not more than 700 nanometers.

(Fabrication Method of Anode Electrode)

Hereinafter, the fabrication method of the anode electrode 10A will be described.

First, the cobalt oxide layer 11A is formed on the nitride semiconductor substrate 12. The cobalt oxide layer 11A may be formed by a method for disposing $Co_3O_4$ directly on the nitride semiconductor substrate 12 using a nanoparticles dispersion device. The cobalt oxide layer 11 may be formed by heating cobalt ion precursors or cobalt metal disposed on the nitride semiconductor substrate 12 by a sol-gel method, a spin coating method, a dipping method, a sputtering method, or a vapor deposition method. The atmosphere of the heating contains oxygen. The temperature of the heating is desirably not more than 900 degrees Celsius.

Then, as shown in FIG. 1A, the terminal electrode 13 is formed on the nitride semiconductor substrate 12. The terminal electrode 13 is electrically connected to the cathode electrode through the conducting wire. The terminal electrode 13 may be formed of a transparent conductive material or metal. An example of the transparent conductive material is ZnO, indium-tin oxide (hereinafter, referred to as "ITO") or $SnO_2$. An example of the metal is gold, aluminum, copper, nickel, or silver.

(Water Splitting Device)

Figure 2:
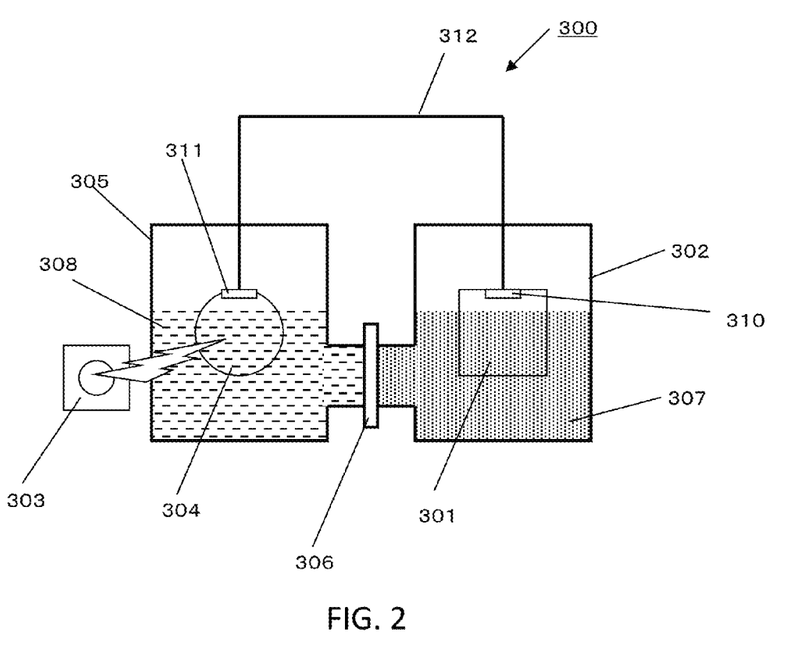
FIG. 2 is a schematic view showing an embodiment of a water splitting device according to the present disclosure.

FIG. 2 is a schematic view showing an embodiment of a water splitting device 300 for splitting water by light irradiation. The water splitting device 300 comprises a cathode container 302, an anode container 305 and a proton exchange membrane 306. A first electrolyte 307 is provided in the cathode container 302. The cathode container 302 contains a cathode electrode 301. The cathode electrode 301 is in contact with the first electrolyte solution 307. Specifically, the cathode electrode 301 is immersed in the first electrolyte 307.

The first electrolyte 307 stored in the cathode container 302 may be a typical electrolyte solution having electric conductivity. An example of the first electrolyte 307 is a sodium hydroxide aqueous solution (i.e., NaOH aqueous solution), a potassium hydroxide aqueous solution (i.e., KOH aqueous solution), a potassium hydrogen carbonate aqueous solution (i.e., $KHCO_3$ aqueous solution), a sodium hydrogen carbonate aqueous solution (i.e., $NaHCO_3$ aqueous solution), a potassium chloride aqueous solution (i.e., KCl aqueous solution), a sodium chloride aqueous solution (i.e., NaCl aqueous solution), a potassium sulfate aqueous solution (i.e., $K_2SO_4$ aqueous solution), or a potassium phosphate aqueous solution (i.e., $K_3PO_4$ aqueous solution). The first electrolyte solution 307 may have a concentration of not less than 0.5 M.

The cathode electrode 301 is formed of a metal or a metal compound. In a case where water is split to generate hydrogen, an example of the metal used for the cathode electrode 301 is gold, platinum, copper or silver. For example, the cathode electrode 301 has a catalyst layer formed of platinum as a main component on the surface thereof. The cathode electrode 301 may consist only of the catalyst layer; however, the cathode electrode 301 may have a stacked structure of the catalyst layer and a substrate which supports the catalyst layer. An example of the stacked structure is an electrode where the catalyst layer having a shape of a thin film is formed on a substrate or an electrode where catalysts each having a shape of a particle is supported on the substrate having electric conductivity. An example of the material of the substrate is glass or glassy carbon. As long as the cathode electrode 301 has an ability to reduce water, the cathode electrode 301 is not limited. In a case where carbon dioxide is reduced on the cathode electrode 301, an example of the metal used for the cathode electrode 301 is copper, indium, or gold. As long as the metal or the metal compound is in contact with the first electrolyte solution 307, only a part of the cathode electrode 301 may be immersed in the first electrolyte solution 307.

The second electrolyte solution 308 is stored in the anode container 305. The anode container 305 contains the anode electrode 304. The anode electrode 304 is the anode electrode according to the present disclosure. For example, the anode electrode 304 is the anode electrode 10A or 10B. The anode electrode 304 is in contact with the second electrolyte solution 308. Specifically, the anode electrode 304 is immersed in the second electrolyte 308.

The solute of the second electrolyte 308 stored in the anode container 305 may be the same as or different from the solute of the first electrolyte 307 stored in the cathode container 302. The second electrolyte 308 stored in the anode container 305 may be a typical electrolyte solution having electric conductivity. An example of the second electrolyte 308 is a sodium hydroxide aqueous solution (i.e., NaOH aqueous solution), a potassium hydroxide aqueous solution (i.e., KOH aqueous solution), a potassium hydrogen carbonate aqueous solution (i.e., $KHCO_3$ aqueous solution), a sodium hydrogen carbonate aqueous solution (i.e., $NaHCO_3$ aqueous solution), a potassium chloride aqueous solution (i.e., KCl aqueous solution), a sodium chloride aqueous solution (i.e., NaCl aqueous solution), a potassium sulfate aqueous solution (i.e., $K_2SO_4$ aqueous solution), or a potassium phosphate aqueous solution (i.e., $K_3PO_4$ aqueous solution). The second electrolyte solution 308 may have a concentration of not less than 0.5 M.

As will be described later, a region of the anode electrode 304 immersed in the second electrolyte solution 308 is irradiated with light having a wavelength to be absorbed by at least the nitride semiconductor substrate 12. The light is emitted from a light source 303. An example of the light source 303 is a xenon lamp, a mercurial lamp or a halogen lamp. Two or more light sources may be used. Pseudo sunlight source or sunlight may also be used as the light source 303.

The proton exchange membrane 306 is disposed between the cathode container 302 and the anode container 305 to separate the first electrolyte 307 from the second electrolyte 308. In other words, the first electrolyte 307 is not mixed with the second electrolyte 308 in the water splitting device 300. Protons (i.e., $H^+$) travel through the proton exchange membrane 306. Other materials are prevented from travelling through the proton exchange membrane 306. An example of the proton exchange membrane 306 is a Nafion membrane.

The cathode electrode 301 and the anode electrode 304 comprise electrode terminals 310 and 311, respectively. These electrode terminals 310 and 311 are electrically connected to each other through a conducting wire 312 without an external power supply such as a poteniostat. In other words, the cathode electrode 301 is electrically connected to the anode electrode 304 through the conducting wire 312 without an external power supply.

(Method for Splitting Water by Light Irradiation)

Hereinafter, a method for splitting water using the above-mentioned water splitting device 300 will be described.

The water splitting device 300 may be placed at room temperature and in atmospheric pressure. As shown in FIG. 2, the anode electrode 304 is irradiated with the light emitted by the light source 303. More specifically, the nitride semiconductor substrate 12 included in the anode electrode 304 is irradiated with the light. An example of the light source 303 is a xenon lamp. The light emitted by the light source 303 includes light to be absorbed by the nitride semiconductor substrate 12. For example, the light to be absorbed has a wavelength of not more than 400 nanometers.

When the cathode electrode 301 comprises the catalyst layer formed of platinum as a main component, water contained in the second electrolyte solution 308 is oxidized by irradiating the anode electrode 304 with the light. As a result, oxygen is generated on the surface of the anode electrode 304.

EXAMPLES

Hereinafter, the present disclosure will be described in more detail with reference to the following examples.

Inventive Example 1

In the inventive example 1, the anode electrode 10A shown in FIG. 1A was used. The anode electrode 10A was fabricated as below.

A GaN substrate having a thickness of 330 micrometers and a diameter of 2 inches was prepared as the nitrides semiconductor substrate 12. The cobalt oxide layer 11A was formed by a metal organic compound deposition method (hereinafter, referred to as "MOD method") on the GaN substrate. Specifically, a cobalt MOD solution (Co-03, available from Kojundo Chemical Laboratory Co., Ltd.) was diluted with a diluent (Coat F solution, available from Kojundo Chemical Laboratory Co., Ltd.) by 10% at a volume ratio. The diluted cobalt MOD solution (200 microliters) was dropped onto the GaN substrate. Then, the GaN substrate was rotated at 500 rpm for 5 seconds to spread the diluted cobalt MOD solution on the surface of the GaN substrate. Subsequently, the GaN substrate was rotated at 3,000 rpm for 30 seconds. Then, the GaN substrate was loaded into a vacuum dry oven. The vacuum dry oven was depressurized to approximately $1\times10^{-3}$ Pa. The GaN substrate was heated to 200 degrees Celsius at a heating rate of 10 degrees Celsius/minute. The GaN substrate was left in the vacuum dry oven at 200 degrees Celsius for one hour to remove the organic solvent contained in the MOD solution. Then, the vacuum dry oven was cooled naturally. The GaN substrate was unloaded from the vacuum dry oven. Then, the GaN substrate was loaded to an anneal furnace. The GaN substrate was heated to 700 degrees Celsius at a heating rate of 10 degrees Celsius/minute in the anneal furnace in the atmosphere. The GaN substrate was left in the anneal furnace at 700 degrees Celsius for 30 minutes. In this way, $Co_3O_4$ was crystallized on the surface of the GaN substrate.

Figure 3:
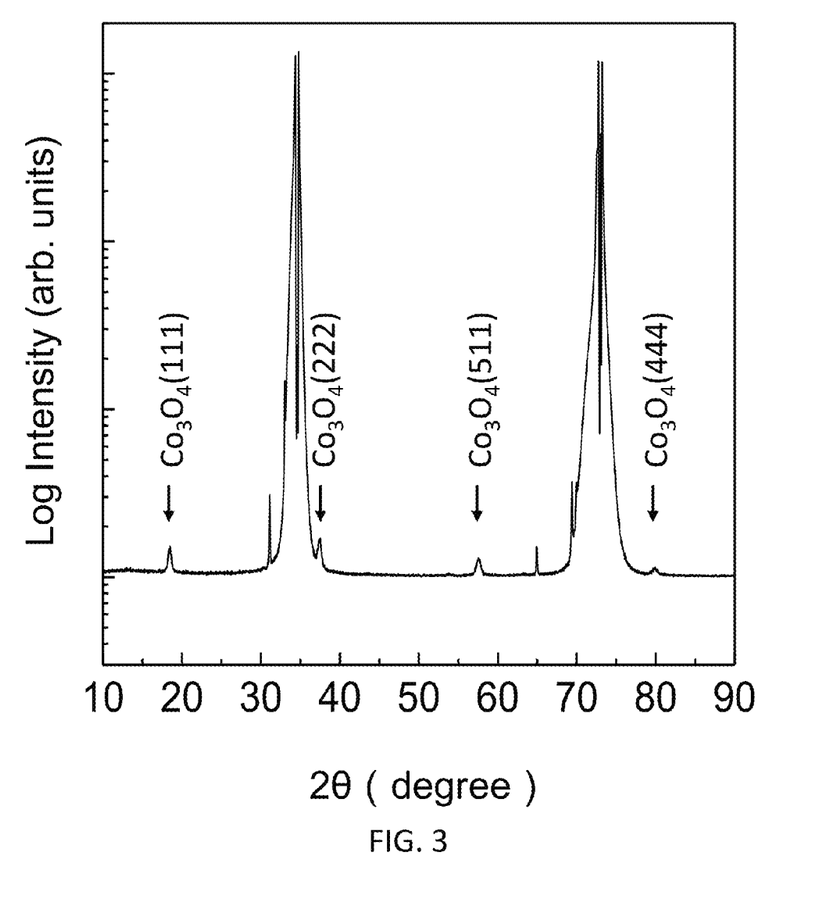
FIG. 3 is an X-ray diffraction analysis result of the material crystallized on the surface of the GaN substrate in the inventive example 1.

FIG. 3 is an X-ray diffraction analysis result of the material crystallized on the surface of the GaN substrate. As shown in FIG. 3, the peaks derived from the crystallized $Co_3O_4$ were observed. This means that $Co_3O_4$ was formed on the surface of the GaN substrate of the anode electrode fabricated in the inventive example 1. According to the image obtained by a cross-sectional TEM measurement (not shown), the present inventors observed that $Co_3O_4$ particles each having a diameter of approximately 10 nanometers were formed on the surface of the GaN substrate. Furthermore, in the TEM image, the present inventors observed that the joint interface between the $Co_3O_4$ and the GaN substrate was formed at an atomic level.

Then, the terminal electrode 13 including a stacked structure of titanium (i.e., Ti)/aluminum (i.e., Al)/gold (i.e., Au) was formed on the surface of the GaN substrate 12. The stacked structure had a thickness of approximately 500 nanometers. In this way, the anode electrode 10A shown in FIG. 1A was provided.

A platinum plate having a thickness of 0.1 millimeter was used as the cathode electrode. The area of the platinum plate immersed in the first electrolyte solution was approximately 13 $cm^2$.

The water splitting device shown in FIG. 2 was prepared using these anode electrode and cathode electrode. The distance between the anode electrode and the cathode electrode was approximately 13 cm.

In the inventive example 1, a potassium hydrogen carbonate aqueous solution (i.e., $KHCO_3$ aqueous solution) having a concentration of 0.5 M was used as the first electrolyte solution. A sodium hydroxide aqueous solution (i.e., NaOH aqueous solution) having a concentration of 5.0 M was used as the second electrolyte solution. A Nafion film (available from DuPont, trade name: Nafion 117) was used as the proton exchange membrane. A xenon lamp was used as the light source. The xenon lamp has an output of 300 W and a light irradiation area of approximately 2.25 $cm^2$ on the anode electrode. The irradiation light intensity absorbed by the anode electrode was approximately 34 mW.

The surface of the anode electrode was irradiated for a certain period with light having an ultraviolet light component and a visible light component and emitted by the light source 303 through a window (not shown) mounted on the anode container. In this way, water was split. In the inventive example 1, the light source 303 emitted the light having a wavelength band of not less than 290 nanometers and not more than 840 nanometers.

Comparative Example 1

An experiment similar to the inventive example 1 was conducted, except for using an anode electrode which did not include the cobalt oxide layer.

When the surface of the anode electrode (i.e., cobalt oxide layer) was irradiated with the light emitted by the xenon lamp, the present inventors observed that a reactive electric current flowed through the electric wire between the anode electrode and the cathode electrode. The present inventors also observed with a gas chromatography that oxygen and hydrogen were generated respectively on the anode electrode and the cathode electrode during the light irradiation.

Figure 4:
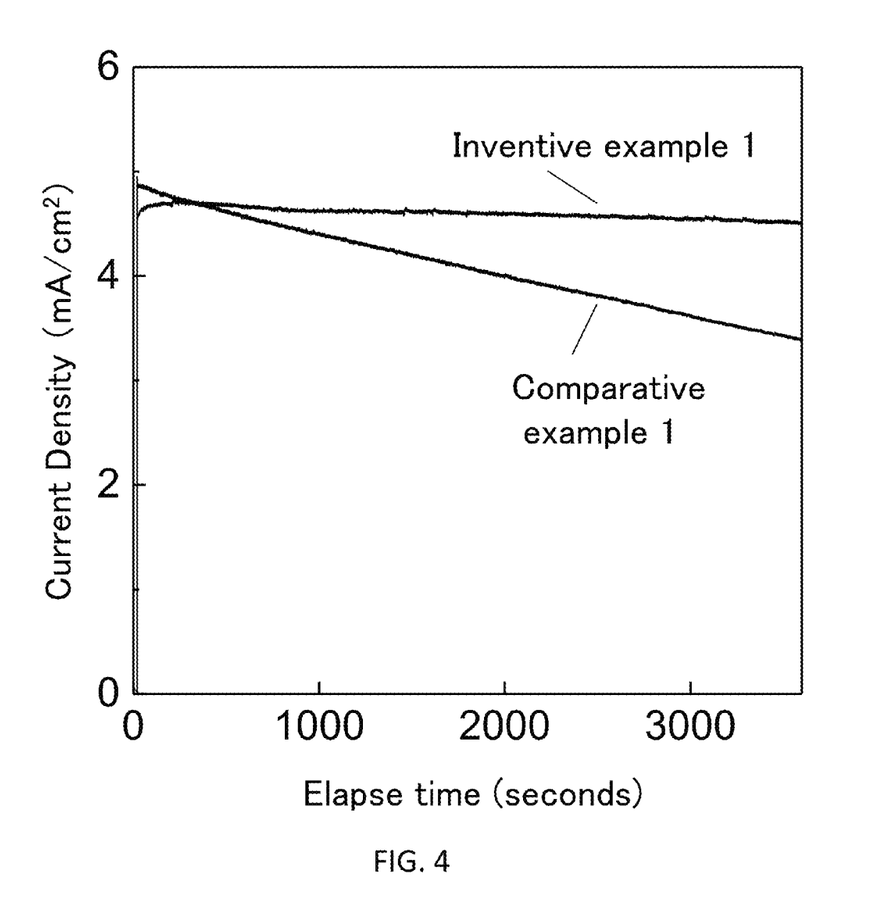
FIG. 4 is a graph showing a current density change in the inventive example 1 and the comparative example 1.

FIG. 4 is a graph showing a current density change in the inventive example 1 and the comparative example 1. As is clear from FIG. 4, the current density was maintained at a constant value in the inventive example 1, whereas the current density was decreased in the comparative example 1 with the lapse of time, namely, with an increase in an irradiation period. In the comparative example 1, the present inventors observed the anode electrode after the comparative example 1 was conducted. As a result, an irradiation trace was found on the surface of the GaN substrate. This means that the surface of the GaN substrate was etched by light irradiation in the comparative example 1 and that thereby the electric current density was decreased. The decrease of the electric current density lowers the production amount of oxygen. On the other hand, the present inventor observed that oxygen was generated stably for a long time in the inventive example 1, since the electric current density is constant. In other words, the present inventors observed that water was split stably for a long time in the inventive example 1.

Comparative Example 2

An experiment similar to the inventive example 1 was conducted, except for using an anode electrode having nickel oxide in place of the cobalt oxide layer.

The anode electrode used in the comparative example 2 was fabricated as below.

Nickel oxide particles were dispersed in turpentine to prepare a nickel oxide solution. The nickel oxide solution was dropped onto a GaN substrate. The GaN substrate was rotated to spread the dropped nickel oxide solution on the surface of the GaN substrate. Then, the GaN substrate was heated at 500 degrees Celsius for 20 minutes in the atmosphere. In this way, the nickel particles each having a diameter of 10 approximately micrometers were supported on the GaN substrate.

Figure 5:
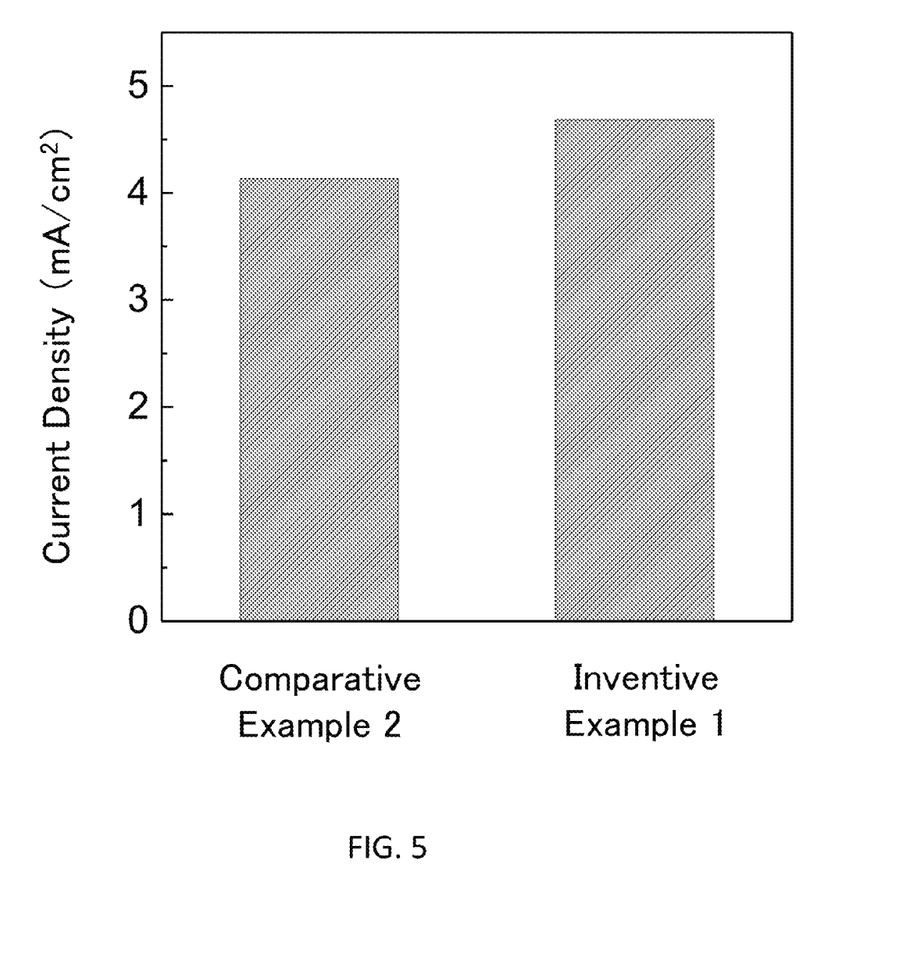
FIG. 5 is a graph showing current density in the inventive example 1 and the comparative example 2 at the time when 100 seconds elapsed from the start of the light irradiation.

FIG. 5 is a graph showing current density in the inventive example 1 and the comparative example 2 at the time when 100 seconds elapsed from the start of the light irradiation. As shown in FIG. 5, the current density in the comparative example 2 at the time when 100 seconds elapsed from the start of the light irradiation was the same as that of the inventive example 1.

Then, an experiment similar to the inventive example 1 was conducted, except for using the light source having twice light intensity. The irradiation light intensity absorbed by the anode electrode was approximately 68 mW.

Figure 6:
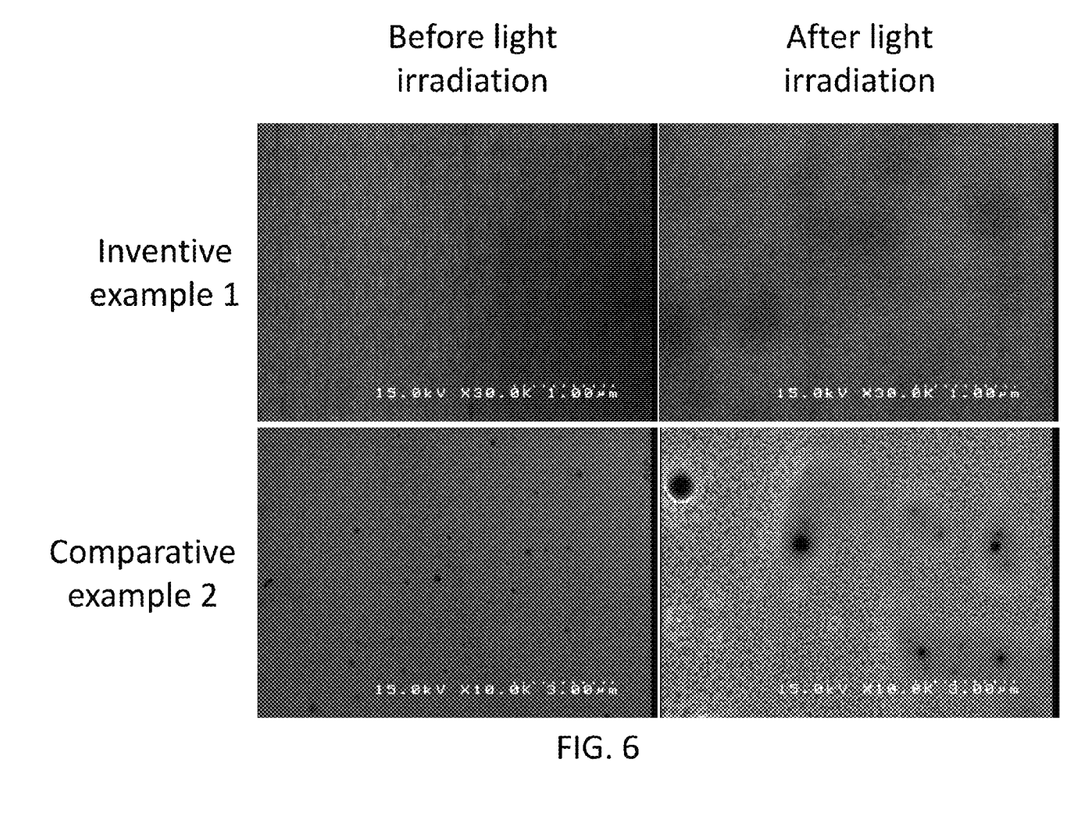
FIG. 6 shows electron microscope images of the surfaces of the anode electrodes in the inventive example 1 and the comparative example 2 before and after the light irradiation.

FIG. 6 shows electron microscope images of the surfaces of the anode electrodes in the inventive example 1 and the comparative example 2 before and after the light irradiation. As shown in FIG. 6, the surface of the GaN substrate of the anode electrode was not etched in the inventive example 1 even after the light irradiation. On the other hand, as shown in FIG. 6, the present inventors observed black regions all around on the surface of the GaN substrate in the comparative example 2. This means that the GaN substrate was etched.

As just described, the electric current density generated in the inventive example 1 was the same as that of the comparative example 2; however, the GaN substrate was not etched in the inventive example 1, whereas the GaN substrate was etched in the comparative example 2.

Comparative Example 3

An experiment similar to the inventive example 1 was conducted, except for using an anode electrode having CoO in place of $Co_3O_4$.

Figure 7:
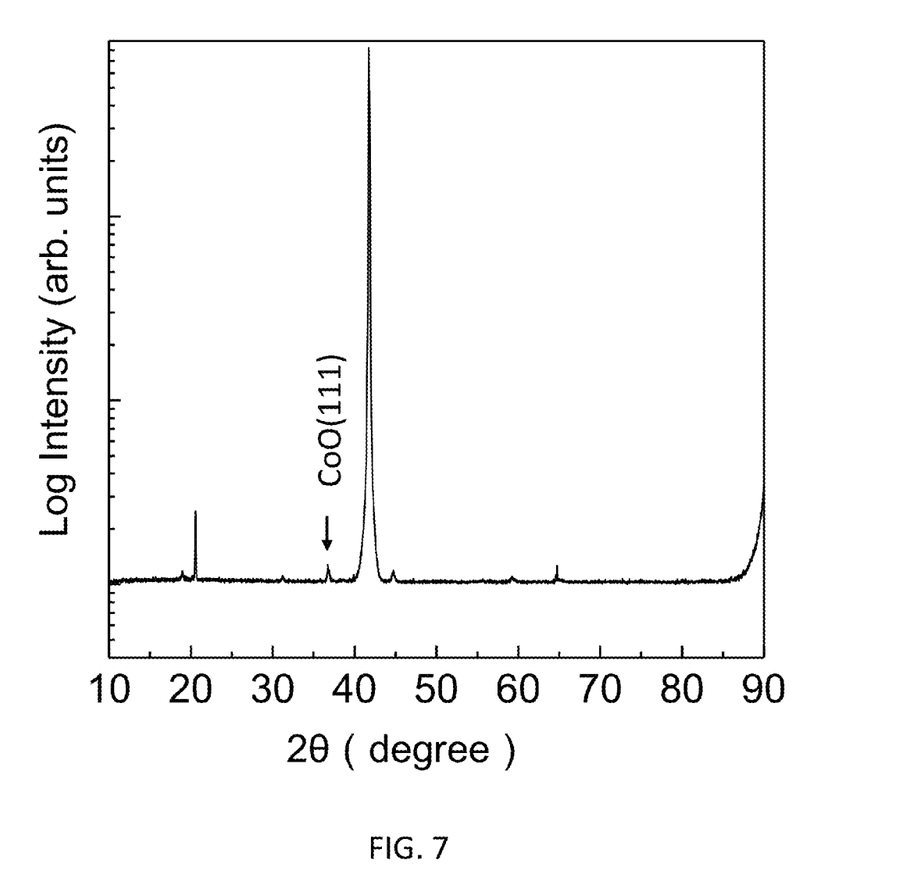
FIG. 7 is a graph showing the X-ray diffraction analysis result on the surface of the GaN substrate in the comparative example 3.

The anode electrode used in the comparative example 3 was fabricate in the same way as that of the inventive example 1, except that the GaN substrate was heated in the anneal furnace in the atmosphere to 1,000 degrees Celsius at a heat rate of 10 degrees/minute and left at 1,000 degrees Celsius for 30 minutes. FIG. 7 is a graph showing the X-ray diffraction analysis result of the material crystallized on the surface of the GaN substrate in the comparative example 3. As shown in FIG. 7, the peak derived from CoO was observed. This means that CoO was formed on the surface of the GaN substrate in the comparative example 3.

Figure 8:
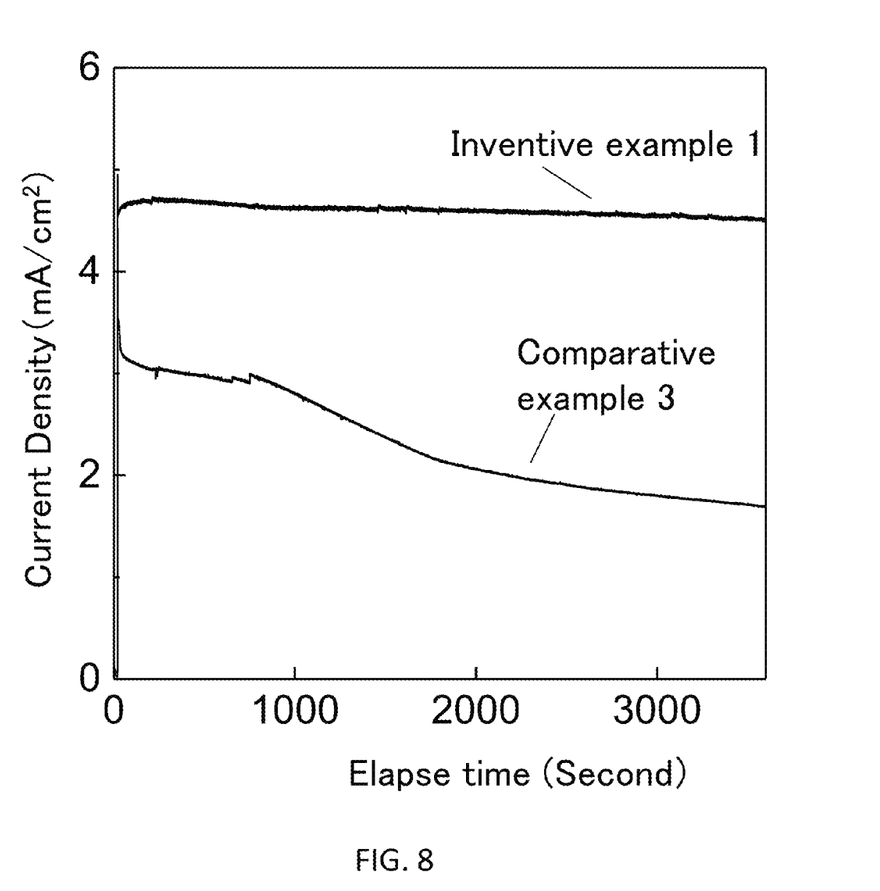
FIG. 8 is a graph showing a current density change in the inventive example 1 and the comparative example 3.

FIG. 8 is a graph showing a current density change in the inventive example 1 and the comparative example 3. As shown in FIG. 8, the electric current density is maintained at a constant value in the inventive example 1, whereas the electric current density is decreased in the comparative example 3 with the lapse of time, namely, with an increase in an irradiation period. This means that the GaN substrate was etched by light irradiation in the comparative example 3 and that thereby the electric current density was decreased. On the other hand, the present inventors observed that oxygen was generated stably for a long time in the inventive example 1, since the electric current density was constant. In other words, the present inventors observed that water was split stably for a long time in the inventive example 1.

INDUSTRIAL APPLICABILITY

The present invention provides a method for splitting water stably for a long time.

REFERENTIAL SIGNS LIST 10A, 10B, 304 Anode electrode
11A, 11B Cobalt oxide layer
12 Nitride semiconductor substrate
13 Terminal electrode
300 Water splitting device
301 Cathode electrode
302 Cathode container
303 Light source
305 Anode container
306 Proton exchange membrane
307 First electrolyte solution
308 Second electrolyte solution
310, 311 Terminal electrode
312 Conducting wire

The invention claimed is:
1. A method for splitting water, the method comprising:
(a) preparing a water splitting device comprising:
a cathode container in which a first electrolyte solution is stored;
an anode container in which a second electrolyte solution is stored;
a proton exchange membrane disposed between the cathode container and the anode container;
a cathode electrode which is in contact with the first electrolyte solution and comprises a metal or metal compound; and an anode electrode which is in contact with the second electrolyte solution and comprises a nitride semiconductor layer; and (b) irradiating the anode electrode with light to split water contained in the first electrolyte solution, wherein:

the anode electrode comprises a cobalt oxide layer formed of $Co_3O_4$ as a main component on a surface of the nitride semiconductor layer, the surface of the nitride semiconductor layer being in contact with the second electrolyte solution; and the cathode electrode is electrically connected to the anode electrode without an external power supply.

2. The method according to claim 1, wherein the cobalt oxide layer is composed of particles each formed of $Co_3O_4$ as a main component.

3. The method according to claim 1, wherein the cobalt oxide layer is composed of a thin film formed of $Co_3O_4$ as a main component.

4. The method according to claim 1, wherein the light has a wavelength of not more than 400 nanometers.

5. The method according to claim 1, wherein the nitride semiconductor layer is selected from the group consisting of a GaN layer, an $Al_{1-x}Ga_xN$ layer ($0<x\leq1$), an $In_{1-y}Ga_yN$ layer ($0<y\leq1$) and an $In_{1-y}Al_{1-x}Ga_{x+y}N_2$ layer ($0<x\leq1$, $0<y\leq1$, and $0<x+y<2$).

6. The method according to claim 1, wherein the water splitting device is placed at room temperature and in atmospheric pressure.

7. A water splitting device comprising:

a cathode container;

an anode container;

a proton exchange membrane disposed between the cathode container and the anode container;

a cathode electrode comprises a metal or metal compound, the cathode electrode being disposed in the cathode container; and an anode electrode comprises a nitride semiconductor layer; the anode electrode being disposed in the anode container, wherein:

the anode electrode comprises a cobalt oxide layer formed of $Co_3O_4$ as a main component on a surface of the nitride semiconductor layer, and the cathode electrode is electrically connected to the anode electrode without an external power supply.

* * * * *